(12) United States Patent
Nagao

(10) Patent No.: US 7,672,014 B2
(45) Date of Patent: Mar. 2, 2010

(54) IMAGE PROCESSING APPARATUS, IMAGE PROCESSING METHOD AND PRINTER DRIVER

(75) Inventor: Noriaki Nagao, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 734 days.

(21) Appl. No.: 11/125,119

(22) Filed: May 10, 2005

(65) Prior Publication Data

US 2005/0254075 A1 Nov. 17, 2005

(30) Foreign Application Priority Data

May 11, 2004 (JP) .................... P2004-140813

(51) Int. Cl.
*G06K 1/00* (2006.01)
*H04N 1/40* (2006.01)

(52) U.S. Cl. .................. 358/1.9; 358/3.23; 358/523; 382/167

(58) Field of Classification Search ............ 358/1.9, 358/523, 3.24
See application file for complete search history.

(56) References Cited

U.S. PATENT DOCUMENTS

| | | | | |
|---|---|---|---|---|
| 6,229,915 | B1 * | 5/2001 | Ohkubo | 382/167 |
| 6,421,140 | B1 * | 7/2002 | Hui | 358/1.9 |
| 6,637,861 | B2 * | 10/2003 | Yamamoto | 347/43 |
| 2003/0123070 | A1 * | 7/2003 | Weiner | 358/1.9 |
| 2004/0246527 | A1 * | 12/2004 | Kakutani | 358/3.01 |
| 2005/0128495 | A1 * | 6/2005 | Arai | 358/1.9 |

FOREIGN PATENT DOCUMENTS

| | | | |
|---|---|---|---|
| EP | 1093923 A1 * | 4/2001 | |
| JP | 01-099847 | 4/1989 | |
| JP | 06-255160 | 9/1994 | |
| JP | 2001-036760 | 2/2001 | |
| JP | 2001-061076 | 3/2001 | |
| JP | 2001-103328 | 4/2001 | |
| JP | 2001-186368 | 6/2001 | |
| JP | 2001-277473 | 9/2001 | |

* cited by examiner

*Primary Examiner*—Mark K Zimmerman
*Assistant Examiner*—Huo Long Chen
(74) *Attorney, Agent, or Firm*—The Nath Law Group; Jerald L. Meyer; Derek Richmond

(57) ABSTRACT

An image processing apparatus includes: a color conversion LUT selecting section selecting a fundamental color conversion LUT from among a set of fundamental color conversion LUTs, preliminarily prepared in compliance with different combinations of fundamental ink colors, based on information of ink colors to be used in multicolor-printing and information of fundamental ink colors defining each fundamental color conversion LUT; a color converting section converting pixel values, associated with a multicolor original image, from a display color space of the selected fundamental color conversion LUT to an ink color space of the selected fundamental color conversion LUT; and a correction processing section correcting pixel values stored in the selected fundamental color conversion LUT, in the ink color space, based on feature points information of the ink colors to be used in the multicolor-printing and feature points information of fundamental ink colors defining the selected fundamental color conversion LUT.

13 Claims, 10 Drawing Sheets

IMAGE PROCESSING APPARATUS, IMAGE PROCESSING METHOD AND PRINTER DRIVER

BACKGROUND OF THE INVENTION

The present invention relates to an image processing apparatus, an image processing method, and a printer driver for converting multilevel pixel values (hereinafter abbreviated "pixel values") in a display color space, associated with display colors of multicolor original image data, into pixel values in an ink color space (or print color space), associated with ink colors to be used for multicolor-printing a multicolor original with a plurality of color inks.

In general, in multicolor-printing a multicolor original with a plurality of color inks, it has been a usual practice to conduct "color separation" methods converting pixel values in a display color space (such as the RGB color space), associated with display colors of multicolor original image data, into pixel values in an ink color space (such as the CMY color space), associated with ink colors to be used for the multicolor-printing.

Such color separation methods are classified broadly into the following categories:

(a) a method, disclosed in Japanese Patent Application Laid-open No. 2001-277473, converting pixel values in the RGB color space into pixel values in the CMY color space by a conversion formula as typified by a Nuegebauer formula; and (b) a method, disclosed in Japanese Patent Application Laid-open No. 2001-186368, converting pixel values in the RGB color space into pixel values in the CMY color space by a color conversion look up table (hereinafter called "color conversion LUT").

In particular, the method (b) has been commonly used because it easily shifts a color range for favorable color reproduction.

SUMMARY OF THE INVENTION

However, since a color conversion LUT used for the method (b) commonly is a comprehensive conversion table containing various conversion data such as color conversion, color correction, color enhancement, and density correction, not only the method (b) should need preliminarily a color conversion LUT depending on many printing conditions such as ink colors to be used, the associated multicolor-printing order, and more, but also the method (b) should need extremely troublesome tasks in which a skilled engineer repeats the process of trial and error in order to prepare the color conversion LUT.

In a case where there are small numbers of ink colors to be used in actual multicolor-printing and small numbers of variations in the associated multicolor-printing order, it may be sufficed to prepare preliminarily color conversion LUTs associated with all printing conditions and then select a favorite color conversion LUT depending on a printing condition from among the color conversion LUTs for each printing. However, as the number of ink colors to be used and the number of variations of the associated multicolor-printing order increase, a color conversion LUT should be prepared for each printing condition with a lot of time and cost, and further capacity of a memory unit for storing the color conversion LUT should be bloated.

To address the issues described above, the present invention provides an image processing apparatus, an image processing method, and a printer driver for converting pixel values in a display color space, associated with display colors of multicolor original image data, into pixel values in an ink color space, associated with ink colors to be used for multicolor-printing a multicolor original with a plurality of color inks, based on a set of fundamental color conversion LUTs prepared preliminarily in compliance with different combinations of fundamental ink colors.

According to a first aspect of the present invention, there is provided an image processing apparatus comprising: a color conversion LUT selecting section selecting a fundamental color conversion LUT from among a set of fundamental color conversion LUTs, preliminarily prepared in compliance with different combinations of fundamental ink colors, based on information of ink colors to be used in multicolor-printing and information of fundamental ink colors defining each fundamental color conversion LUT; a color converting section converting multilevel pixel values, associated with a multicolor original image, in a display color space of the selected fundamental color conversion LUT into multilevel pixel values in an ink color space of the selected fundamental color conversion LUT; and a correction processing section correcting one of the converted multilevel pixel values and multilevel pixel values, stored preliminarily in the selected fundamental color conversion LUT, in the ink color space, based on feature points information of the ink colors to be used in the multicolor-printing and feature points information of fundamental ink colors defining the selected fundamental color conversion LUT.

Another aspect of the present invention provides an image processing method comprising: selecting a fundamental color conversion LUT from among a set of fundamental color conversion LUTs, preliminarily prepared in compliance with different combinations of fundamental ink colors, based on information of ink colors to be used in multicolor-printing and information of fundamental ink colors defining each fundamental color conversion LUT; correcting multilevel pixel values in an ink color space of the selected fundamental color conversion LUT, based on feature points information of the ink colors to be used in the multicolor-printing and feature points information of fundamental ink colors defining the selected fundamental color conversion LUT; and converting multilevel pixel values, associated with a multicolor original image, in a display color space of the selected fundamental color conversion LUT, into the corrected multilevel pixel values in the ink color space of the selected fundamental color conversion LUT.

Another aspect of the present invention provides a printer driver comprising: a color conversion LUT selecting section selecting a fundamental color conversion LUT from among a set of fundamental color conversion LUTs, preliminarily prepared in compliance with different combinations of fundamental ink colors, based on information of ink colors to be used in multicolor-printing and information of fundamental ink colors defining each fundamental color conversion LUT; a color converting section converting multilevel pixel values, associated with a multicolor original image made by an application program, in a display color space of the selected fundamental color conversion LUT into multilevel pixel values in an ink color space of the selected fundamental color conversion LUT; and a correction processing section correcting one of the converted multilevel pixel values and multilevel pixel values, stored preliminarily in the selected fundamental color conversion LUT, in the ink color space, based on feature points information of ink colors to be used in the multicolor-printing and feature points information of fundamental ink colors defining the selected fundamental color conversion LUT.

DETAILED DESCRIPTION OF THE PREFERRED EMBODIMENTS

Hereinafter, preferred embodiments according to the present invention are described in detail with reference to FIGS. 1 to 12. Also, throughout the drawings, the same or equivalent component parts bear like or equivalent reference numbers to omit or simplify description.

First Embodiment

Figure 1:
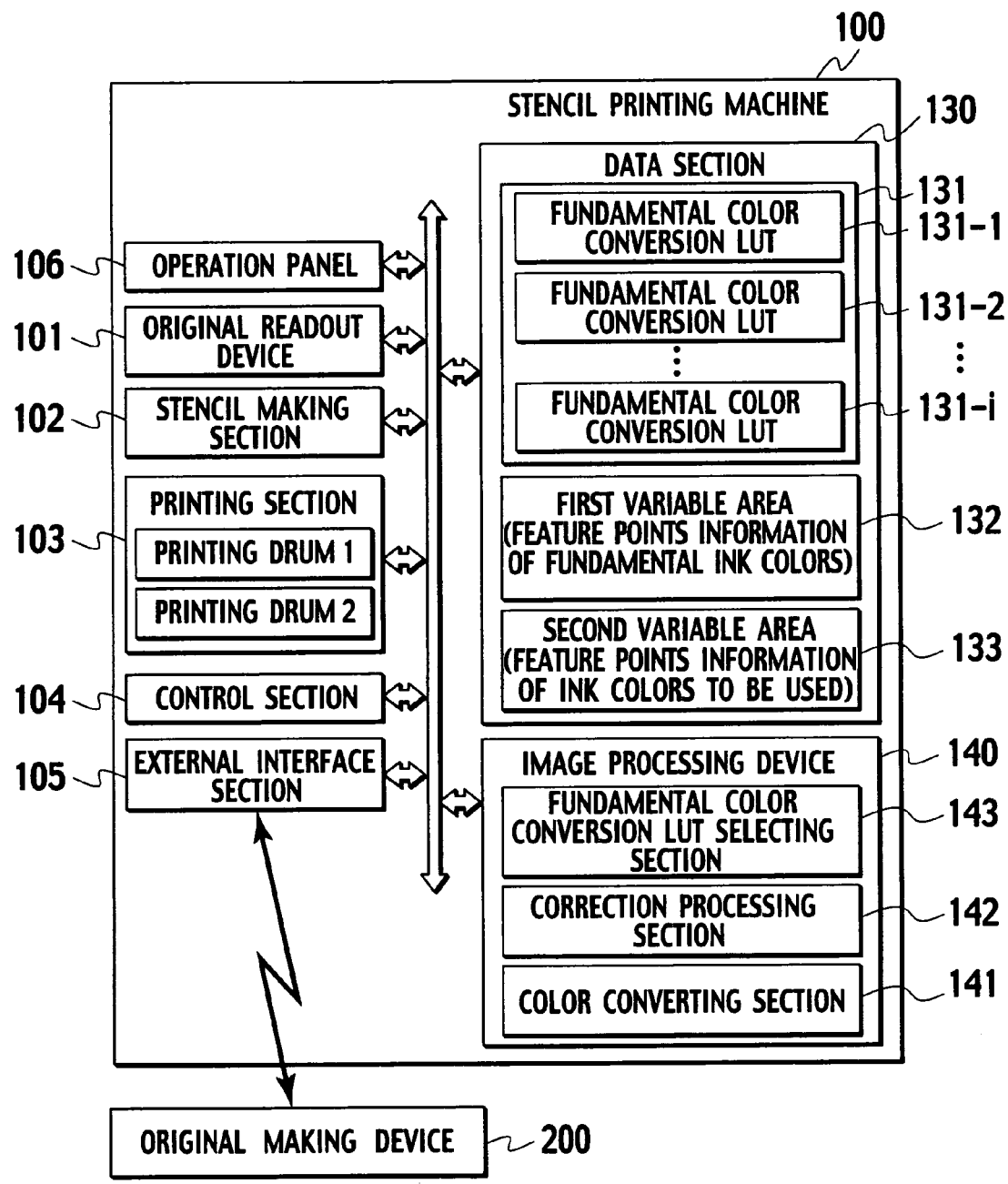
FIG. 1 is a schematic block diagram illustrating a structure of a printing system of a first embodiment according to the present invention.

As shown in FIG. 1, a printing system of the first embodiment includes a stencil printing machine 100 and an original making device 200.

The stencil printing machine 100 includes an original readout section 101, a stencil making section 102, a printing section 103, a control section 104, an external interface section 105, an operation panel 106, a data section 130, and an image processing device 140. The stencil printing machine 100 is a multicolor printing machine on which a plurality of printing drums with different color inks are simultaneously mounted.

The control section 104 includes a central processing unit (CPU), a RAM, and a ROM (not shown). The CPU allows the RAM to read out programs and data stored in the ROM, the data section 130, and storage unit (not shown), and thereafter controls the stencil printing machine 100 in accordance with the programs and data read out.

The operation panel 106 includes an input section (not shown) having a touch panel and switches for receiving inputs from a user, and a display section (not shown) having a liquid crystal panel and lamps for providing the user with various information.

The external interface section 105 has a function for allowing the stencil printing machine 100 to be connected to other devices (such as the original making device 200) via network.

The original readout section 101 optically reads out a multicolor original to be reproduced in multicolor-printing as multicolor original image data.

The stencil making section 102 thermally perforates a stencil sheet (or stencil master) for each separated stencil (that is, each color ink to be used in multicolor-printing) on the basis of single color image data, which is obtained by executing a color separation to the multicolor original image data read out in the image processing apparatus 140

The printing section 103 has fist and second printing drums 1 and 2 mounted in first and second mount positions 1 and 2, respectively, and presses print sheets to the first and second printing drums 1 and 2, respectively, to trensfer and print the multicolor original onto a print sheet by perforating of the stencil sheets adhered with color inks supplied from the first and second printing drums 1 and 2, respectively The data section 130 includes acolor conversion LUT group 131, a first variable area 132, and a second variable area 133

The color conversion LUT group 131 includes a set of fundamental color conversion LUTs 131-1, 131-2, . . .,131-i prepared preliminarily in compliance with different combinations of fundamental ink colors Each fundamental color conversion LUT stores a conversion data (e.g., conversion table) between pixel values in the RGB color space and pixel values in an ink color space (hereinafter called "fundamental ink color space") defined by a proper combination of fundamental ink colors.

The first variable area 132 stores information of feature points (hereinafter called "feature points information") of the fundamental ink colors defing the fundamental ink color space of each fundamental color conversion LUT.

The second variable area 133 stores feature points information of ink colors to be used in actual multicolor-printing (hereinafter called "actually used ink colors").

Also, the color conversion LUT group 131, the first and second variable areas 132 and 133 may be provided in the image processing apparatus 140.

The image processing apparatus 140 includes a color converting section 141, a correction processing section 142, and a fundamental color conversion LUT selecting section 143.

In the first embodiment, the image processing apparatus 140 conducts the following operations:

(a) selecting an optimum fundamental color conversion LUT from the color conversion LUT group 131 (that is, the set of fundamental color conversion LUTs 131-1, 131-2, . . . , 131-i);

(b) correcting the selected fundamental color conversion LUT by using feature points information of the actually used ink colors and feature points information of the fundamental ink colors defining the fundamental ink color space of the selected fundamental color conversion LUT; and (c) converting pixel values in the RGB color space, associated with display colors of the multicolor original image data, which are read out by the original readout section 101 or transmitted from the original making device 200, into pixel values in an ink color space (hereinafter called "output ink color space") of the corrected fundamental color conversion LUT.

Also, the image processing apparatus 140 acquires information of the actually used ink colors and the associated multicolor-printing order information from the control section 104.

For more detail, the fundamental color conversion LUT selecting section 143 selects an optimum fundamental color conversion LUT from the color conversion LUT group 131 (that is, the set of fundamental color conversion LUTs 131-1, 131-2, . . . , 131-$i$) preliminarily prepared in compliance with different combinations of fundamental ink colors, which are stored in the data section 130, based on information (measured color information about various color spaces) of the actually used ink colors and information (measured color information about various color spaces) of the fundamental ink colors defining the fundamental ink color space of each fundamental color conversion LUT.

The correction processing section 142 corrects pixel values in the fundamental ink color space of the selected fundamental color conversion LUT by using feature points information of the actually used ink colors and feature points information of the fundamental ink colors defining the fundamental ink color space of the selected fundamental color conversion LUT.

The color converting section 141 converts pixel values in the RGB color space, associated with ink colors of the multicolor original image data, into pixel values in the output ink color space of the corrected fundamental color conversion LUT.

Figure 2:
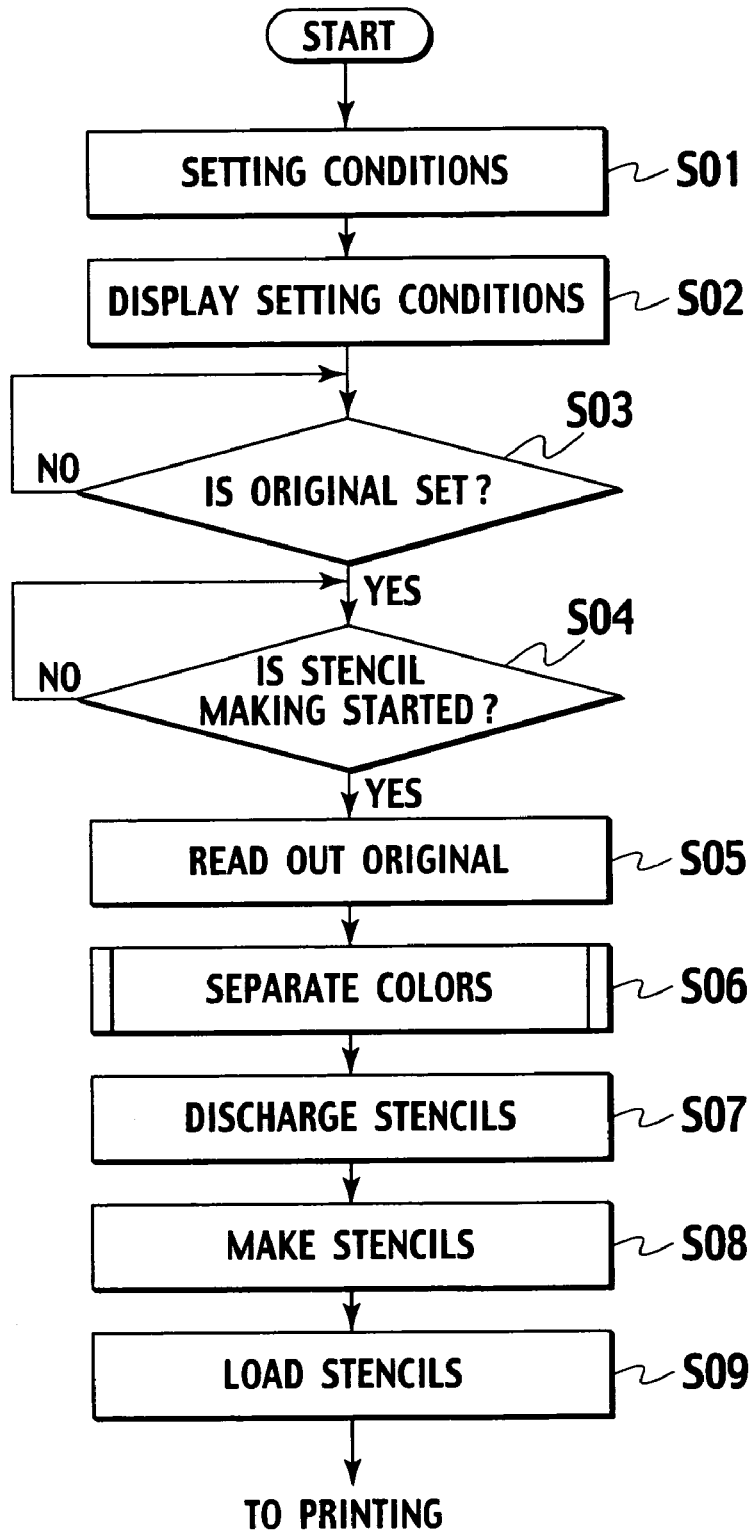
FIG. 2 is a flowchart illustrating a procedure executed by the stencil printing machine shown in FIG. 1.

FIG. 2 is a flowchart illustrating a procedure executed by the stencil printing machine 100 when stencil making and printing based on single color image data, which is obtained by executing a color separation to the multicolor original image data, which is read out by the original readout section 101, in the image processing apparatus 140. Also, the operations described below of the stencil printing machine 100 are realized such that a stencil making and printing screen (not shown) displayed on the operation panel 106 is selected, and then the control unit 104 controls various components of the stencil printing machine 100.

In step S01, the control unit 104 receives printing conditions such as the actually used ink colors, the associated multicolor-printing order and so on, which are inputted by a user on the operation panel 106, and in step S02 the control unit 104 allows the received printing conditions to be displayed on the operation panel 106.

In step S03, the control unit 104 discriminates whether or not an original is set in the original image readout section 101. If this condition is fulfilled, the procedure goes to step S04, and if not, it remains in a standby status.

In step S04, the control unit 104 discriminates whether or not the user commands to start a stencil making through the operation panel 106. If this condition is fulfilled, the procedure goes to step S05, and if not, it remains a standby status.

In step S05, the original readout section 101 reads out a multicolor original set on an original set table as a multicolor original image data to send the read-out multicolor original to the image processing apparatus 140.

In step S06, the image processing apparatus 140 executes a color separation, which will be described below, and thereafter sends single image data (stencil making image data) obtained by the color separation to the stencil making section 102.

In step S07, the control unit 104 discharges used stencil sheets from the printing drums 1 and 2, respectively.

In step S08, the stencil making section 102 executes a stencil making for making stencil sheets based on the stencil making image data sent from the image processing apparatus 140.

In step S09, the control unit 104 allows the prepared stencil sheets to be attached to the printing drums 1 and 2, respectively, and thereafter allows the operation step to go to a printing operation.

Figure 3:
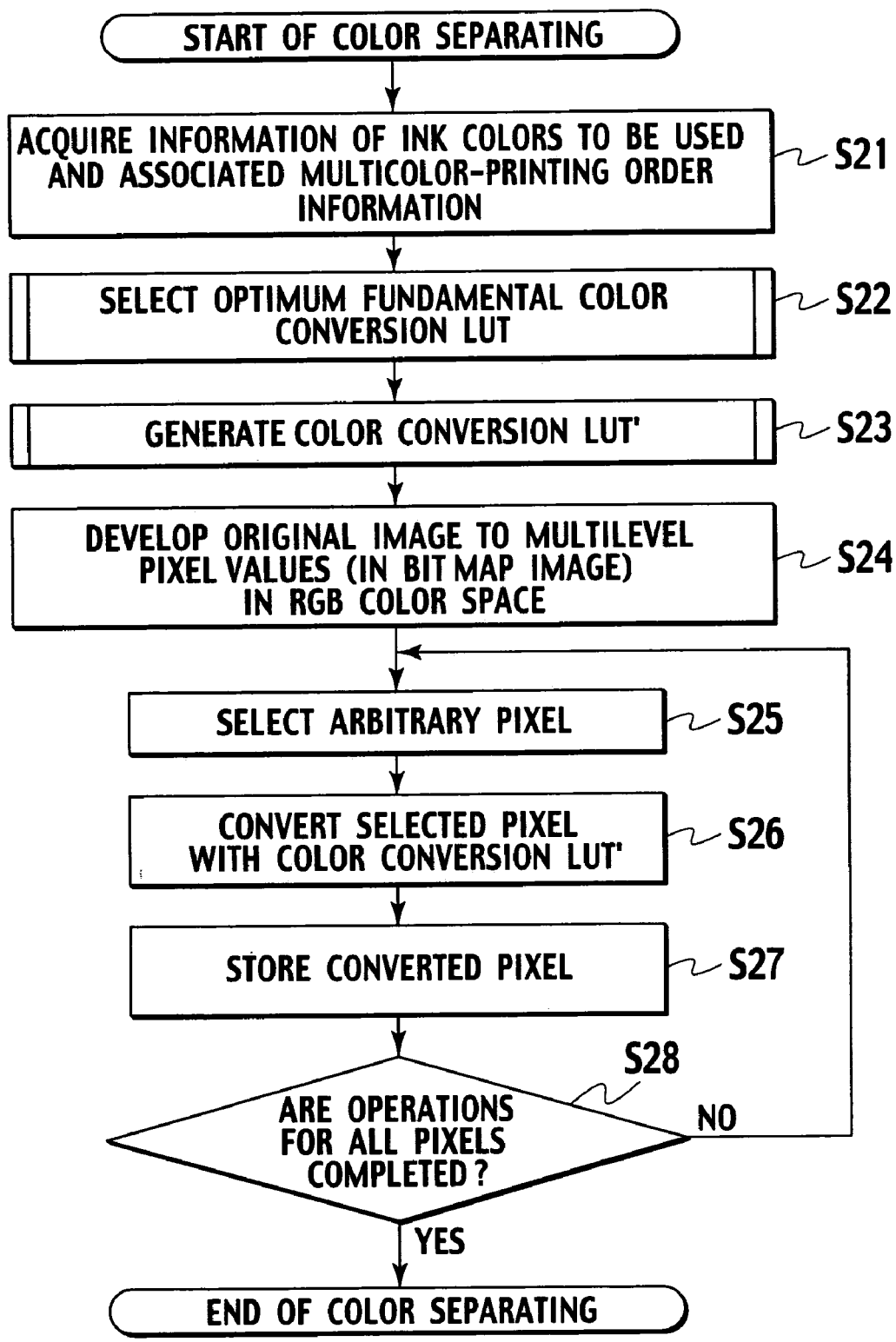
FIG. 3 is a flowchart illustrating a detailed procedure (first embodiment) of a color separation shown in step S06 in FIG. 2.

FIG. 3 is a flowchart illustrating a detailed procedure of the color separation shown in step S06 of FIG. 2.

The color separation of the first embodiment has the following steps:

(1) selecting an optimum fundamental color conversion LUT from among the fundamental color conversion LUT group 131 (that is, a set of fundamental color conversion LUTs 131-1, 131-2, . . . , 131-$i$) preliminarily prepared in compliance with different combinations of fundamental ink colors, based on information (for example, measured color information about the L*a*b color space) of the actually used ink colors and information (for example, measured color information about the L*a*b color space) of the fundamental ink colors defining the fundamental ink color space of each fundamental color conversion LUT;

(2) generating a new color conversion LUT' by correcting pixel values in the fundamental ink color space of the selected fundamental color conversion LUT on the basis of feature points information of the actually used ink colors and feature points information of the fundamental ink colors defining the fundamental ink color space of the selected fundamental color conversion LUT 131-2.

Hereinafter, different ink colors C1 (for example, a red lineage color) and C2 (for example, a green lineage color) will be supposed as ink colors to be used in actual multicolor-printing of a multicolor original (hereinafter called the actually used first and second actual ink colors C1 and C2).

Further, the following six combinations will be supposed as the different combinations of fundamental ink colors: (1) (C1(1), C2(1)=(RED, BLUE); (2) (C1(2), C2(2))=(RED, GREEN); (3) (C1(3), C2(3))=(RED, CYAN); (4) (C1(4), C2(4))=(RED, BLACK); (5) (C1(5), C2(5))=(BLUE, YELLOW); and (6) (C1(6), C2(6))=(GREEN, MAGENTA).

The data section 130 preliminarily stores the six fundamental color conversion LUTs 131-1, 131-2, . . . , 131-6 associated with the six combinations of fundamental ink colors described above.

Each fundamental color conversion LUT 131-$i$ (for i=1, 2, . . . , 6), ((r, g, b)→(C1(r, g, b), C2(r, g, b)), is made by allowing input patches (C1(i), C2(i)) made by a computer to correspond to pixel values (r, g, b) obtained by measuring output patches, which are obtained by actually printing the input patches (C1(i), C2(i)), by using a color measuring device. Here, the RGB color space defined by the pixel values (r, g, b) described above and the fundamental ink color space defined by the input patches (C1(i), C2(i)) described above are finite areas, called color gamut, respectively.

Further, the first variable area 132 preliminarily stores the feature points information of the fundamental ink colors defining the fundamental ink color space of each fundamental color conversion LUT 131-$i$ (for i=1, 2, . . . , 6) and furthermore the second variable area 133 preliminarily stores the feature points information of the actually used ink colors C1 and C2.

Regarding the fundamental ink colors C1(i) and C2(i) defining the fundamental ink color space of each fundamental color conversion LUT 131-$i$ (for i=1, 2, . . . , 6), for instance, the first variable area 132 preliminarily stores the eight pixel values (color conversion output values) (C1(i)(r, g, b), C2(i) (r, g, b))=(c11(i), c21(i)), (c12(i), c22(i)), (c13(i), c23(i)), (c14(i), c24(i)), (c15(i), c25(i)), (c16(i), c26(i)), (c17(i), c27 (i)), and (c18(i), c28(i)), into which the eight pixel values (r, g, b)=(0, 0, 0), (0, 0, 1), (0, 1, 0), (1, 0, 0), (0, 1, 1), (1, 0, 1), (1, 1, 0), and (1, 1, 1) (feature points) in the RGB color space are converted by each fundamental color conversion LUT 131-$i$ (for i=1, 2, . . . , 6), respectively, as feature points information of the fundamental ink colors C1(i) and C2(i) defining the fundamental ink color space of each fundamental color conversion LUT. Here the variables r, g, and b satisfy the conditions: $0 \leq r \leq 1$, $0 \leq g \leq 1$, and $0 \leq b \leq 1$, respectively.

Here, it should be noted that the features points information (C1(i)(r, g, b), C2(i)(r, g, b)) may be three pixel values such as (c14(i), c24(i)), (c15(i), c25(i)), and (c18(i), c28(i)), into which the three pixel value's (r, g, b)=(1, 0, 0), (0, 1, 1), and (1, 1, 1) (feature points) in the RGB color space are converted by each fundamental color conversion LUT 131-$i$ (for i=1, 2, . . . , 6), because other five pixel values (e.g. (C16(i), C26(i))) can be represented by functions (for example, a linear function) of the above three pixel values (e.g. C14(i), C24(i)).

Similarly, regarding the actually used ink colors C1 and C2, for instance, the second variable area 133 preliminarily stores the eight pixel values (color conversion output values) (C1(r, g, b), C2(r, g, b))=(c11, c21), (c12, c22), (c13, c23), (c14, c24), (c15, c25), (c16, c26), (c17, c27), and (c18, c28), into which the eight pixel values (r, g, b)=(0, 0, 0), (0, 0, 1), (0, 1, 0), (1, 0, 0), (0, 1, 1), (1, 0, 1), (1, 1, 0), and (1, 1, 1) in the RGB color space are converted by a formula, respectively, as feature points information of the actually used ink colors C1 and C2. Here the variables r, g, and b satisfies the conditions: $0 \leq r \leq 1$, $0 \leq g \leq 1$, and $0 \leq b \leq 1$. The formula described above is, for example, as follows:

$$(C1(r, g, b), C2(r, g, b)) = (C1(i)(r, g, b) \times (L \text{ value of } C1)/(L \text{ value of } C1(i)), C2(i)(r, g, b) \times (L \text{ value of } C2)/(L \text{ value of } C2(i)))$$

where C1(i)(r, g, b) and C2(i)(r, g, b) are the feature points information of the fundamental ink color C1(i) and C2(i); the L value is the first value of measured color information (L, a, b) in the L*a*b color space. Of course, information in other color space can be used as the measured color information described above.

Further, information of color information measured by a color measuring device can be used as the feature points information (C1(r, g, b), C2(r, g, b)) of the actually used ink colors C1 and C2. Here, it should be noted that the features points information (C1(r, g, b), C2(r, g, b)) may be three pixel values such as (c14, c24), (c15, c25), and (c18, c28), into which the three pixel values (r, g, b)=(1, 0, 0), (0, 1, 1), and (1, 1, 1) in the RGB color space are converted by the formula described above, because other five pixel values can be represented by functions (for example, a linear function) of the above three pixel values.

Also, the above pixel values (C1(r, g, b), C2(r, g, b)) and (C1(i)(r, g, b), C2(i)(r, g, b) (for i=1, 2, . . . , 6) may include pixel values (C1>1, C2>1, c1(i)>1, c2(i)>1, C1<0, C2<0, C1(i)<0, and C2(i)<0) of an area outside each fundamental ink color space. Here, the area outside each fundamental ink color space means an area protruding from the above described input patches (C1(i), C2(i)) (that is, the color gamut) of each fundamental color conversion LUT 131-$i$ (for i=1, 2, . . . , 6)). In general, although a color conversion LUT have many probabilities wherein pixel values of an area outside a fundamental ink color space are clipped (saturated) in pixel values of an area within the fundamental ink color space, here is supposed that correction parameters on the above feature points information are configured to employ true pixel values before being saturated.

In step S21, the image processing apparatus 140 acquires information of the actually used ink colors C1 and C2, such as measured color information about the L*a*b color space, and the associated multicolor-printing order information such as the order C1→C2 or C2→C1 from the control unit 104.

In step S22, the fundamental color conversion LUT selecting section 143 selects an optimum fundamental color conversion LUT (for example, the fundamental ink color conversion LUT 131-2) from among the six fundamental color conversion LUTs 131-1, 131-2, . . . , 131-6 preliminarily prepared in compliance with different combinations of fundamental ink colors (in a manner that will be described in detail below).

In step S23, the correction processing section 142 generates a new color conversion LUT' by correcting pixel values in the fundamental ink color space of the selected fundamental color conversion LUT 131-2, based on feature points information of the actually used ink colors C1 and C2 and feature points information of the fundamental ink colors C1(2) and C2(2) defining the fundamental ink color space of the selected fundamental color conversion LUT 131-2 (in a manner that will be described in detail below).

In step S24, the image processing apparatus 140 develops the multicolor original image data read out by the original readout section 101 into pixel values (that is, bit map image data) in the RGB color space.

In step S25, the color converting section 141 selects an arbitrary pixel j(r, g, b) in the RGB color space of the multicolor original image data to be converted by the new color conversion LUT' as a parameter.

In step S26, the color converting section 141 converts the selected pixel j(r, g, b) in the RGB color space into a pixel j(c1(r, g, b), c2(r, g, b)) in the output ink color space of the new color conversion LUT', based on the new color conversion LUT'.

In step S27, the control unit 104 stores the converted pixel j(c1(r, g, b), c2(r, g, b)) in the RAM of the control unit 104.

In step S28, the image processing apparatus 140 discriminates whether or not the color conversing (color correcting) by the new color conversion LUT' have been completed for all pixels in the RGB color space of the multicolor original image data. Then, if this condition is fulfilled, the color separation is completed, and if not, the procedure is routed back to step S25.

Figure 4:
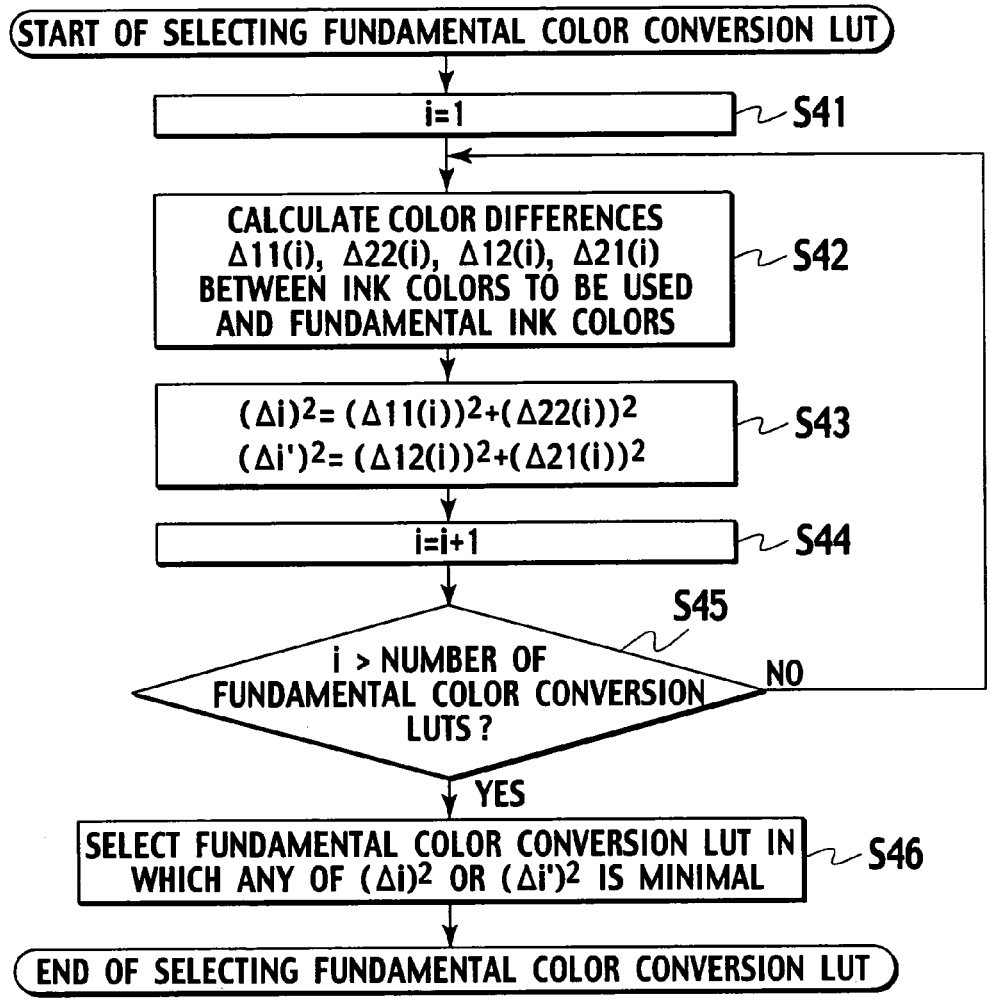
FIG. 4 is a flowchart illustrating a detailed procedure for selecting a fundamental color conversion LUT shown in step S22 of FIG. 3.
Figure 5:
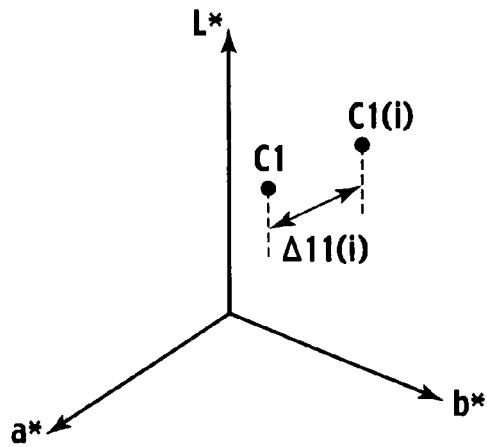
FIG. 5 is a graph illustrating a color difference (a color difference in a color space L*a*b*) calculated in step S42 of FIG. 4.

FIG. 4 is a flowchart illustrating a detailed procedure for selecting the optimum fundamental color conversion LUT 131-2 shown in step S22 in FIG. 3.

In step S41, the fundamental color conversion LUT selecting section 143 sets the index i to be "1".

In step S42, the fundamental color conversion LUT selecting section 143 calculates color differences $\Delta 11(i)$, $\Delta 22(i)$, $\Delta 12(i)$, and $\Delta 21(i)$, based on information (the measured color information about L*a*b color space) of the actually used ink colors C1 and C2 and information (the measured color information about L*a*b color space) of the fundamental ink colors C1(i) and C2(i) defining the fundamental color space of each fundamental color conversion LUT 131-$i$ (for i=1, 2, . . . , 6). Here the color difference $\Delta 11(i)$ represents a color difference between the actually used first ink color C1 and the fundamental ink color C1(i); the color difference $\Delta 22(i)$ a color difference between the actually used second ink color C2 and the fundamental ink color C2(i); the color difference $\Delta 12(i)$ a color difference between the actually used first ink color C1 and the fundamental ink color C2(i); and the color difference Δ 21(i) a color difference between the actually used second ink color C2 and the fundamental ink color C1(i). Here, for example, the color difference Δ 11(i) is described as $$(\Delta 11(i))^2 = (\Delta L11(i))^2 + (\Delta a11(i))^2 + (\Delta b11(i))^2,$$

where Δ L11(i)=L1−L1(i), Δ a11(i)=a1−a1(i), Δ b11(i)=b1−b1(i).

Here Δ L11(i), Δ a11(i), and Δ b11(i) are the difference of the measured color information such as the measured color information about L*a*b color space of the actually used ink colors C1 and C2 and the measured color information about L*a*b color space of the fundamental ink colors C1(i) and C2(i) defining the fundamental color space of each fundamental color conversion LUT 131-i (for i=1, 2, ..., 6). Also, although the color differences are supposed in the L*a*b color space (such as the color difference Δ 11(i) between the actually used first ink color C1 and the fundamental ink color C1(i) in FIG. 5), it is of course to be appreciated in other color spaces such as the L*u*v color space, the RGB color space, the XYZ color space, and others.

In step S43, the fundamental color conversion LUT selecting section 143 calculates squares (Δ i)² and (Δ i')² by substituting the color differences Δ 11(i), Δ 22(i), Δ 12(i), and Δ 21(i) into the following equation (1):

$$(\Delta i)^2 = (\Delta 11(i))^2 + (\Delta 22(i))^2, (\Delta i')^2 = (\Delta 12(i))^2 + (\Delta 21(i))^2 \quad (1)$$

In step S44, the fundamental color conversion LUT selecting section 143 increments the index i by "1", and in step S45, the fundamental color conversion LUT selecting section 143 discriminates whether or not a value of the index i exceeds total numbers (i.e., 6) of the fundamental color conversion LUTs. Then, if this condition is fulfilled, the procedure proceeds to step S46, and if not, the procedure is routed back to step S42.

In step S46, the fundamental color conversion LUT selecting section 143 selects a fundamental color conversion LUT (for example, the fundamental color conversion LUT 131-2) defined by a combination of fundamental ink colors C1(i) and C2(i), in which the squares (Δ i)² or (Δ i')² described above take a minimal value, as an optimum fundamental color conversion LUT from among the six fundamental color conversion LUTs 131-i (for i=1, 2, ..., 6), and finally allows the procedure to be terminated.

Figure 6:
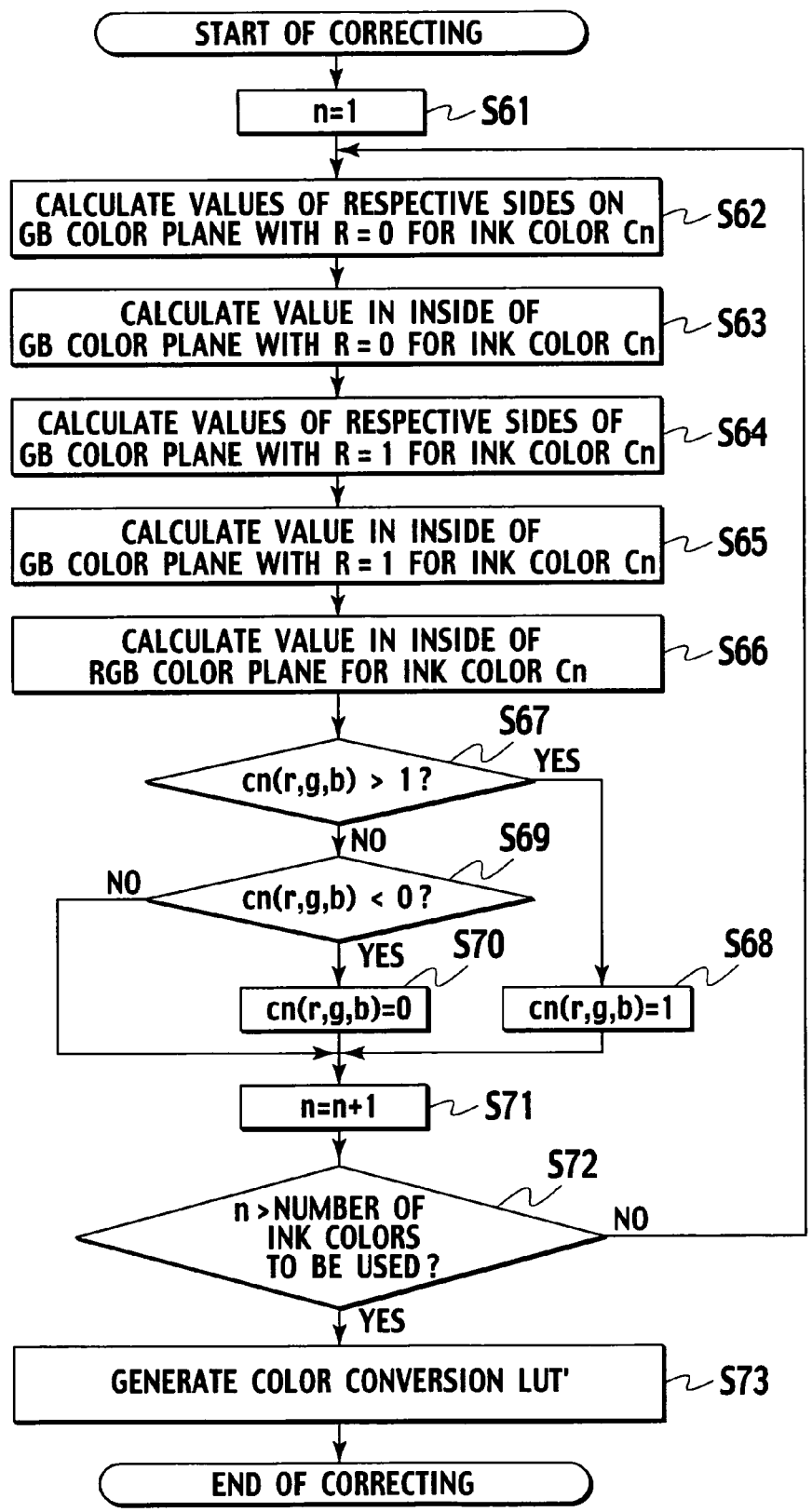
FIG. 6 is a flowchart illustrating a detailed procedure (first embodiment) for correcting a fundamental color conversion LUT shown in step S23 of FIG. 3.

FIG. 6 is a flowchart illustrating a detailed procedure for correcting the selected fundamental color conversion LUT 131-2 shown in step S23 in FIG. 3.

In step S61, the correction processing section 142 sets the index n, which represents the number of the ink colors, to be "1".

In step S62, regarding the actually used first ink color C1, the correction processing section 142 calculates a correction value cn in the fundamental ink color space (or output ink color space) for each side of the GB plane with the condition R=0 in the RGB color space.

Figure 8A:
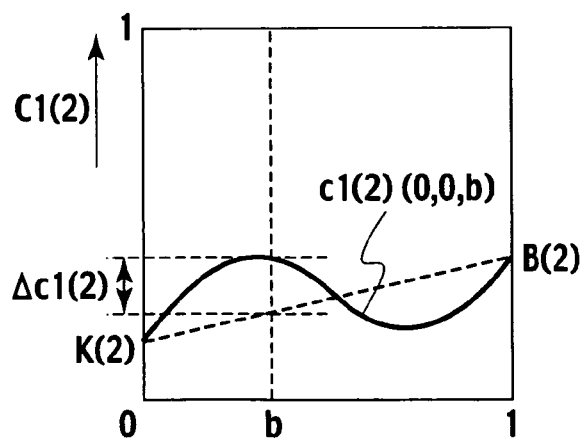
FIGS. 8A and 8B are typical graphs illustrating operations for calculating a correction value of an ink color C1 to be used for multicolor-printing in the fundamental ink color space of the fundamental color conversion LUT based on the feature points information of the ink color C1(2) shown in FIG. 7.
Figure 8B:
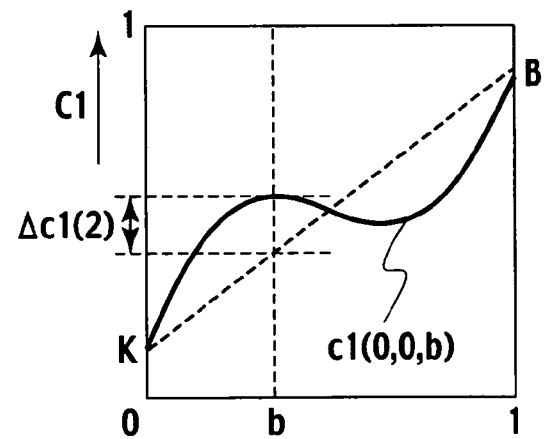

Here, as shown in FIG. 8B, it is supposed that the second variable area 133 stores pixel values (color conversion output values) on eight apexes: c1(1, 1, 1)=W(WHITE) (not shown); c1(0, 0, 0)=K (BLACK); c1(0, 0, 1)=B (BLUE); c1(0, 1, 0)=G (GREEN) (not shown); c1(1, 0, 0)=R (RED) (not shown); c1(0, 1, 1)=C (CYAN) (not shown); c1(1, 0, 1)=M (MAGENTA) (not shown); and c1(1, 1, 0)=Y (YELLOW) (not shown) as feature points information of the actually used first ink color C1 in the output ink color space.

Figure 7:
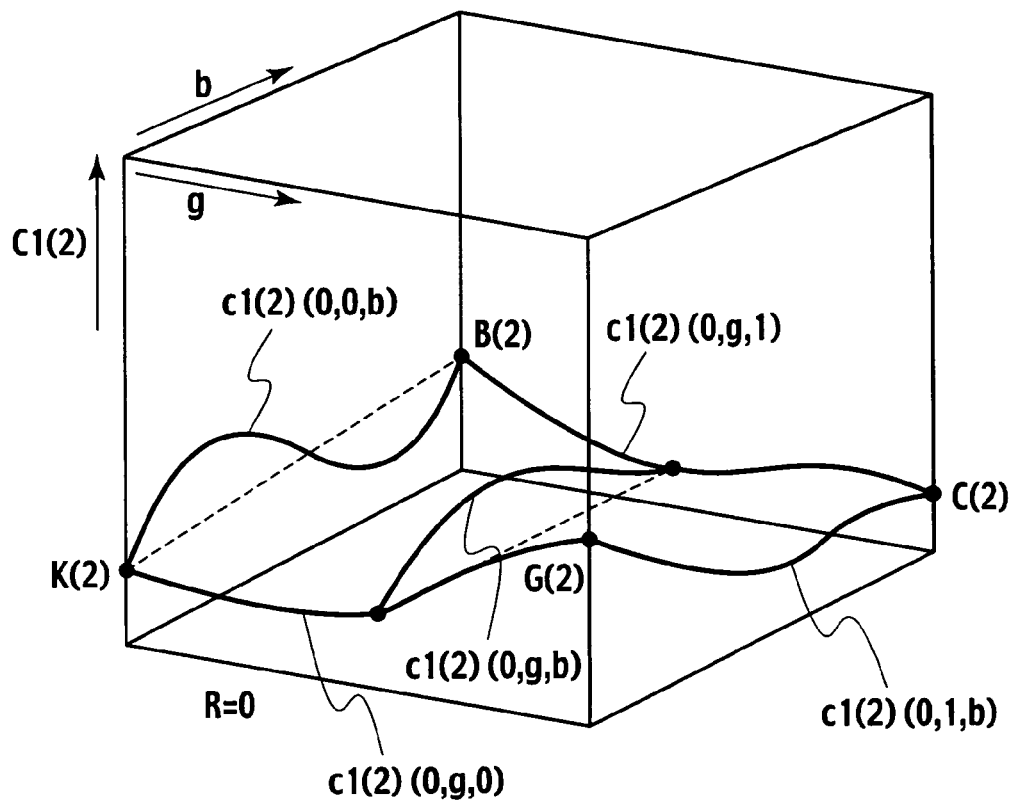
FIG. 7 is a typical graph illustrating feature points information and pixel values of a fundamental ink color C1(2) in a fundamental ink color space of a fundamental color conversion LUT.

Further, as shown in FIG. 7, it is supposed that the first variable area 132 stores pixel values (color conversion output values) on eight apexes: c1(2)(1, 1, 1)=W(2) (WHITE) (not shown); c1(2)(0, 0, 0)=K (2) (BLACK); c1(2) (0, 0, 1)=B(2) (BLUE); c1(2) (0, 1, 0)=G(2) (GREEN); C1(2) (1, 0, 0)=Re (2)(RED) (not shown); c1(2) (0, 1, 1)=C (2)(CYAN); C1(2) (1, 0, 1)=M(2) (MAGENTA) (not shown); and c1(2) (1, 1, 0)=Y(2) (YELLOW) (not shown) as feature points information of the fundamental ink colors defining the fundamental ink color space of the selected fundamental color conversion LUT 131-2.

The correction value (the pixel values of a new color conversion LUT') c1(r, g, b) in the fundamental ink color space of the actually used first ink color C1 for an arbitrary point (R, G, B)=(r, g, b) in the RGB color space is calculated by using: (1) the color conversion output value c1(2)(r, g, b) in the fundamental ink color space of the selected color conversion LUT 131-2 for known points in the RGB color space; (2) the pixel values (feature points information) on the eight apexes for the actually used first ink color C1 and the pixel values (feature points information) of the eight apexes for the ink color C1(2) in the fundamental ink color space of the selected fundamental color conversion LUT 131-2.

First, regarding the actually used first ink color C1, the correction processing section 142 calculates a correction value c1 of an intermediate point in the fundamental ink color space for the respective sides (R, G, B)=(0, 0, b), (0, 1, b), (0, g, 0), and (0, g, 1) on the GB plane with the condition R=0 in the RGB color space.

FIG. 8A is a graph illustrating pixel values of the fundamental ink color C1(2) (the vertical axis) in the fundamental ink color space of the selected fundamental color conversion LUT 131-2 for the side (R, G, B)=(0, 0, b) (the abscissa) on the RGB color space. FIG. 8B is a graph illustrating pixel values of the actually used first ink color C1 (the vertical axis) in the fundamental ink color space of the selected for the side (R, G, B)=(0, 0, b) (the abscissa) in the RGB color space.

As shown in FIG. 8A, regarding the pixel values of fundamental ink color C1(2) in the fundamental ink color space of the selected fundamental color conversion LUT 131-2, the correction processing section 142 calculates the straight line c1(2) connected between the point K(2) (c1(2)(0, 0, 0)) and the point B(2) (c1(2)(0, 0, 1)) by the equation (2):

$$c1(2) = (B(2) - K(2))b + K(2). \quad (2)$$

Further, the correction processing section 142 calculates a difference Δ c1(2) between the pixel value (the color conversion output value) c1(2)(0, 0, b) for the side (R, G, B)=(0, 0, b) and the straight line c1(2) represented by the equation (2) by using the equation (3):

$$\Delta c1(2) = c1(2)(0, 0, b) - ((B(2) - K(2))b + K(2)). \quad (3)$$

Here, as shown in FIG. 8B, regarding the actually used first ink color C1, the correction processing section 142 calculates a correction value c1(0, 0, b) (a pixel value of the new color conversion LUT') for c1(0, 0, b) in the fundamental ink color space for the side (R, G, B)=(0, 0, b) on the RGB color space by substituting the difference Δ c1(2) represented by the equation (3) into the equation (4):

$$c1(0, 0, b) = (B-K)b + K + \Delta c1(2) =$$

$$(B-K)b + K + (c1(2)(0, 0, b) - ((B(2) - K(2))b + K(2))) \quad (4)$$

where the equation (5):

$$c1 = (B-K)b + K \quad (5)$$

represents the straight line connected between the point K(c1 (0, 0, 0)) and the point B(c1(0, 0, 1)).

Similarly, regarding the actually used first ink color C1, the correction processing section 142 calculates the correction values (the pixel values of the new color conversion LUT') c1(0, 1, b), c1(0, g, 0), and c1(0, g, 1) in the fundamental color space for the other sides (R, G, B=(0, 1, b), (0, g, 0), (0, g, 1) with the condition R=0 in the RGB color space by the equations (6) to (8):

$$c1(0, 1, b) = (C-G)b + G + \Delta c1(2) \quad (6)$$
$$= (C-G)b + G + (c1(2)(0, 1, b) - ((C(2) - G(2))b + G(2))),$$

$$c1(0, g, 0) = (G-K)b + K + \Delta c1(2) \quad (7)$$
$$= (G-K)b + K + (c1(2)(0, g, 0) - ((G(2) - K(2))b + K(2))),$$

$$c1(0, g, 1) = (C-B)b + B + \Delta c1(2) \quad (8)$$
$$= (C-B)b + B + (c1(2)(0, g, 1) - ((C(2) - B(2))b + B(2))).$$

Figure 9A:
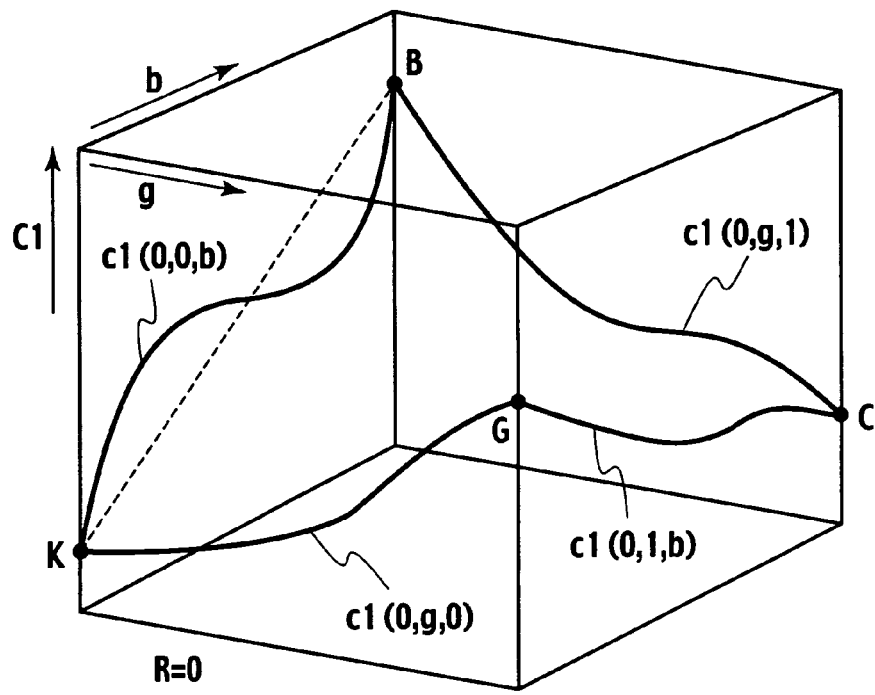
FIGS. 9A and 9B are typical graphs illustrating feature points information and pixel values of the ink color C1 to be used for multicolor-printing in the output ink color space of the color conversion LUT'.

Curved lines KB, GC, KG and CB shown in FIG. 9A represent the equations (5) to (8), respectively.

Next, in step S63, regarding the actually used first ink color C1, the correction processing section 142 calculates a correction value (a pixel value of the new color conversion LUT') in the fundamental ink color space for a point (an arbitrary point inside a square area) on the GB plane with the condition R=0 in the RGB color space.

Figure 9B:
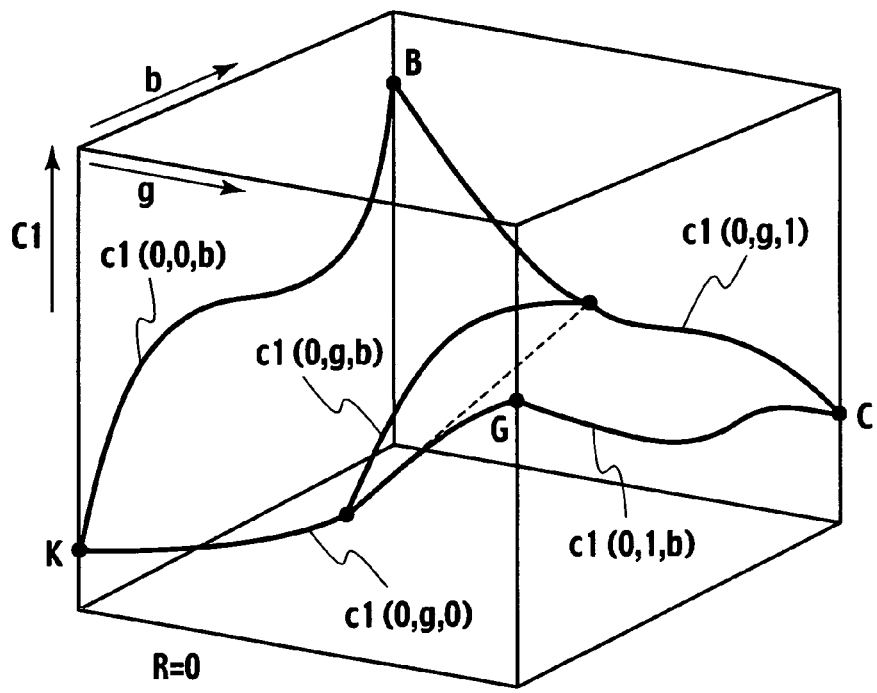

For instance, the correction processing section 142 calculates the correction value (the pixel value of the new color conversion LUT') of the actually used first ink color C1 for the line segment (R, G, B)=(0, g, b) on the GB plane with the condition R=0 in the RGB color space by the equation (9) associated with the point c1(0, g, 0) and the point c1(0, g, 1) shown in FIG. 9B:

$$c1(0, g, b) = (c1(0, g, 1) - c1(0, g, 0))b + c1(0, g, 0) + \Delta c1(2) \quad (9)$$
$$= (c1(0, g, 1) - c1(0, g, 0))b + c1(0, g, 0) + (c1(2)(0, g, b) - ((c1(2)(0, g, 1) - c1(2)(0, g, 0))b + c1(2)(0, g, 0)).$$

in the same manner as the calculation in step S62.

Likewise, regarding the actually used first ink color C1, the correction processing section 142 calculates the correction values (the pixel values of the new color conversion LUT') c1(1, 0, b), c1(1, 1, b), c1(1, g, 0), and c1(1, g, 1) in the fundamental ink color space for the other sides (R, G, B)=(1, 0, b), (1, 1, b), (1, g, 0), and (1, g, 1) on the GB plane with the condition R=1 in the RGB color space.

Next, in step S65, the correction processing section 142 calculates the correction value (the pixel value of the new color conversion LUT') c1(1, g, b) in the fundamental ink color space for the intermediate point (R, G, B)=(1, g, b) on the GB plane with the condition R=1 in the RGB color space by the equation (10):

$$c1(1, g, b) = (c1(1, g, 1) - c1(1, g, 0))b + c1(1, g, 0) + \Delta c1(2) \quad (10)$$
$$= (c1(1, g, 1) - c1(1, g, 0))b + c1(1, g, 0) + (c1(2)(1, g, b) - ((c1(2)(1, g, 1) - c1(2)(1, g, 0))b + c1(2)(1, g, 0)).$$

In step S66, regarding the actually used first ink color C1, the correction processing section 142 calculates the correction value (the pixel value of the new color conversion LUT') c1(r, g, b) in the fundamental ink color space for an arbitrary point (R, G, B)=(r, g, b) in the area (cube) inside the RGB color space.

More particularly, regarding the actually used first color ink C1, the correction processing section 142 calculates the correction value c1(r, g, b) in the fundamental color ink space for an arbitrary point in the area inside the RGB color space by the equation (11), with reference to the pixel value (color conversion output value) c1 in the fundamental ink color space for the GB plane with the condition R=0 in the RGB color space, the pixel value (color conversion output value) c1 in the fundamental ink space for the GB plane with the condition R=1 in the RGB color space, and the point c1(r, g, 0) and the point c1(r, g, 1) cut off by the GB plane and the RB plane with the conditions R=r and G=g:

$$c1(r, g, b) = (c1(r, g, 1) - c1(r, g, 0))b + c1(r, g, 0) + \Delta c1(2) \quad (11)$$
$$= (c1(r, g, 1) - c1(r, g, 0))b + c1(r, g, 0) + (c1(2)(r, g, b) - ((c1(2)(r, g, 1) - c1(2)(r, g, 0))b + c1(2)(r, g, 0)).$$

Figure 10A:
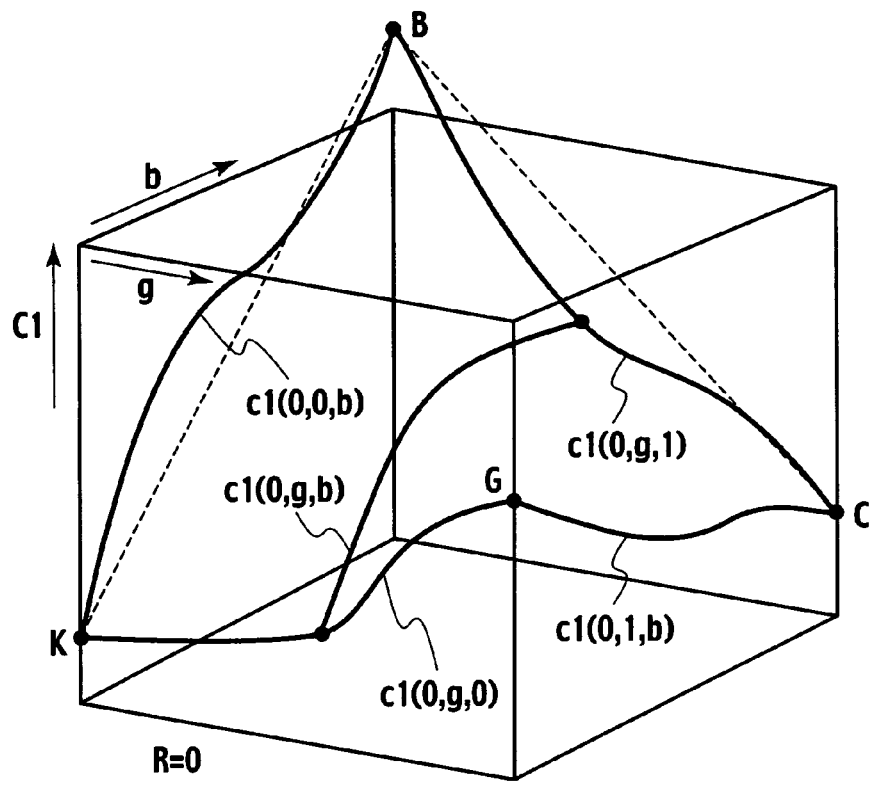
FIGS. 10A and 10B are typical graphs illustrating operations for clipping a feature point in the output ink color space of a color conversion LUT' under a situation where the feature point is set in an area outside the output ink color space.
Figure 10B:
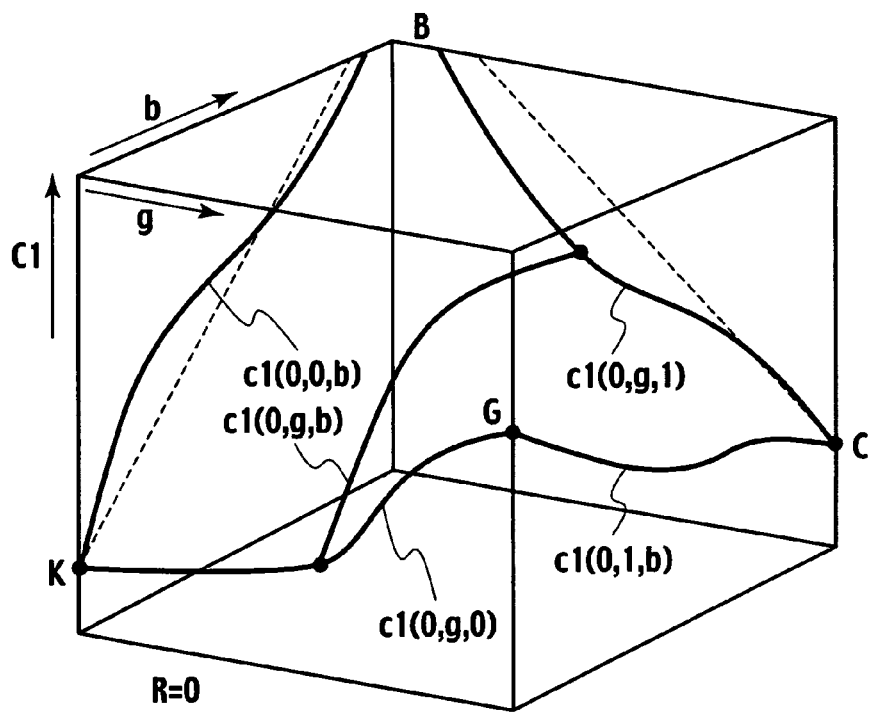

Next, in step S67, regarding the actually used first ink color C1, the correction processing section 142 discriminates whether or not the correction value (the pixel value of the new color conversion LUT') c1 (r, g, b) stands a positive area outside the fundamental ink color space (cube). As a result, if c1(r, g, b)>1 as shown in FIG. 10A, in step S68 the correction processing section 142 clips the correction value (the pixel value of the new color conversion LUT') c1(r, g, b) at c1(r, g, b)=1 as shown in FIG. 10B. On the contrary, if c1(r, g, b)≦1, in step S69 the correction processing section 142 discriminates whether or not the correction value (the pixel value of the new color conversion LUT') c1(r, g, b) stands a negative area outside the fundamental ink color space (cube). As a result, if c1(r, g, b)<0, in step S70 the correction processing section 142 clips at c1(r, g, b)=0. On the contrary, if c1(r, g, b)≧0, the clipping is not executed.

As described above, the correction processing section 142 calculates the correction value (the value of the new color conversion LUT') c1(r, g, b) of the actually used first ink color C1.

Next, in step S71, the correction processing section 142 increments the index n by "1", and in step S72 the correction processing section 142 discriminates whether or not a value of the index "n" exceeds total numbers (i.e., 2) of ink colors. Then, if so, the procedure proceeds to step S73, and if not, the procedure is routed back to step S62. When step S62 is performed again by returning from step S71, regarding the actually used second ink C2, the processes described above are performed.

In step S73, the correction processing section 142 generates a new color conversion LUT': (r, g, b)→(c1(r, g, b), c2(r, g, b)) from the selected color conversion LUT 131-2: (r, g, b)→(C1(2)(r, g, b), C2(2)(r, g, b)), based on the correction value data (c1(r, g, b), c2(r, g, b)) as calculated above.

In such a way, the correction processing section 142 corrects pixel values in the fundamental ink color space stored in the selected fundamental color conversion LUT 131-2, based on feature points information of the actually used ink colors C1, C2 and feature points information of the fundamental ink colors C1(2), C2(2) defining the fundamental ink color space of the selected fundamental color conversion LUT 131-2, thereby generating a new color conversion LUT'.

The features of the first embodiment described above are summed up that:

(F1) the optimum fundamental color conversion LUT 131-2 is selected from the color conversion LUT group 131 (the set of fundamental color conversion LUTs 131-1, 131-2, ..., 131-6) preliminarily prepared in compliance with different combinations of fundamental ink colors, based on information of the actually used ink colors C1, C2 and information of fundamental ink colors C1(i), C2(i) (for i=1, 2, ..., 6) defining the fundamental ink color space of each fundamental color conversion LUT 131-i (for i=1, 2, ..., 6); and (F2) an arbitrary pixel j(C1(2)(r, g, b), C2(2)(r, g, b)) in the fundamental ink color space stored in the selected fundamental color conversion LUT 131-2 is corrected, based on feature points information of the actually used ink colors C1, C2 and feature points information of the fundamental ink colors C1(2), C2(2) defining the fundamental ink color space of the selected fundamental color conversion LUT 131-2 for thereby generating the new color conversion LUT': (r, g, b)→(c1(r, g, b), c2(r, g, b)).

Thus, the first embodiment according to the present invention enables pixel values in a display color space, corresponding to an original color of multicolor original image data, to be converted to pixel values in an ink color space, corresponding to ink colors to be used in actual multicolor-printing, without preliminarily preparing a color conversion LUT for each printing condition, whereby a favorable printing result can be obtained.

Second Embodiment

The first embodiment has been described in conjunction with an example wherein the optimum fundamental color conversion LUT 131-2 is selected from the color conversion LUT group 131 (the set of fundamental color conversion LUTs 131-1, 131-2, ..., 131-6) preliminarily prepared in compliance with different combinations of fundamental ink colors on the basis of information of the actually used ink colors C1, C2 and information of fundamental ink colors C1(i), C2(i) (i=1, 2, ..., 6) defining the fundamental ink color space of each fundamental color conversion LUT, on which pixel value in the fundamental ink color space stored in the selected fundamental color conversion LUT 131-2 is corrected on the basis of feature points information of the actually used ink colors C1, C2 and feature points information of the fundamental ink colors C1(2), C2(2) defining the fundamental ink color space of the selected fundamental color conversion LUT 131-2, for thereby generating the new color conversion LUT'.

On the contrary, the second embodiment is described in conjunction with an example wherein an arbitrary pixel of multicolor image data in the fundamental ink color space of the selected fundamental color conversion LUT 131-2, converted by the fundamental color conversion LUT 131-2, is corrected on the basis of feature points information of the actually used ink colors C1, C2 and feature points information of the fundamental ink colors C1(2), C2(2) defining the fundamental ink color space of the selected fundamental color conversion LUT 131-2.

In the second embodiment, the image processing apparatus 140 conducts the following operations:

(a') selecting an optimum fundamental color conversion LUT from the color conversion LUT group 131 (that is, the set of fundamental color conversion LUTs 131-1, 131-2, ..., 131-i);

(b') converting pixel values in the RGB color space, associated with display colors of multicolor original image data, which are read out by the readout section 101 or transmitted from the original making device 200, into pixel values in the fundamental ink color space of the selected fundamental color conversion LUT, by using the selected fundamental color conversion LUT.

(c') correcting the converted pixel values, which are converted by the selected fundamental color conversion LUT, in the fundamental ink color space of the selected fundamental color conversion LUT, based on the feature points information of the actually used ink colors and feature points information of the fundamental ink colors defining the fundamental ink color space of the selected fundamental color conversion LUT.

For more detail, the fundamental color conversion LUT selecting section 143 selects an optimum fundamental color conversion LUT from the color conversion LUT group 131 (that is, the set of fundamental color conversion LUTs 131-1, 131-2, ..., 131-i) preliminarily prepared in compliance with different combinations of fundamental ink colors, which are stored in the data section 130, based on information of the actually used ink colors and information of the fundamental ink colors defining the fundamental ink color space of each fundamental color conversion LUT.

The color converting section 141 converts pixel values in the RGB color space, associated with ink colors of multicolor original image data, into pixel values in the fundamental ink color space of the selected fundamental color conversion LUT.

The correction processing section 142 corrects the converted pixel values, which are converted by the selected fundamental color conversion LUT, in the fundamental ink color space of the selected fundamental color conversion LUT, based on feature points information of the actually used ink colors and feature points information of the fundamental ink colors defining the fundamental ink color space of the selected fundamental color conversion LUT.

Figure 11:
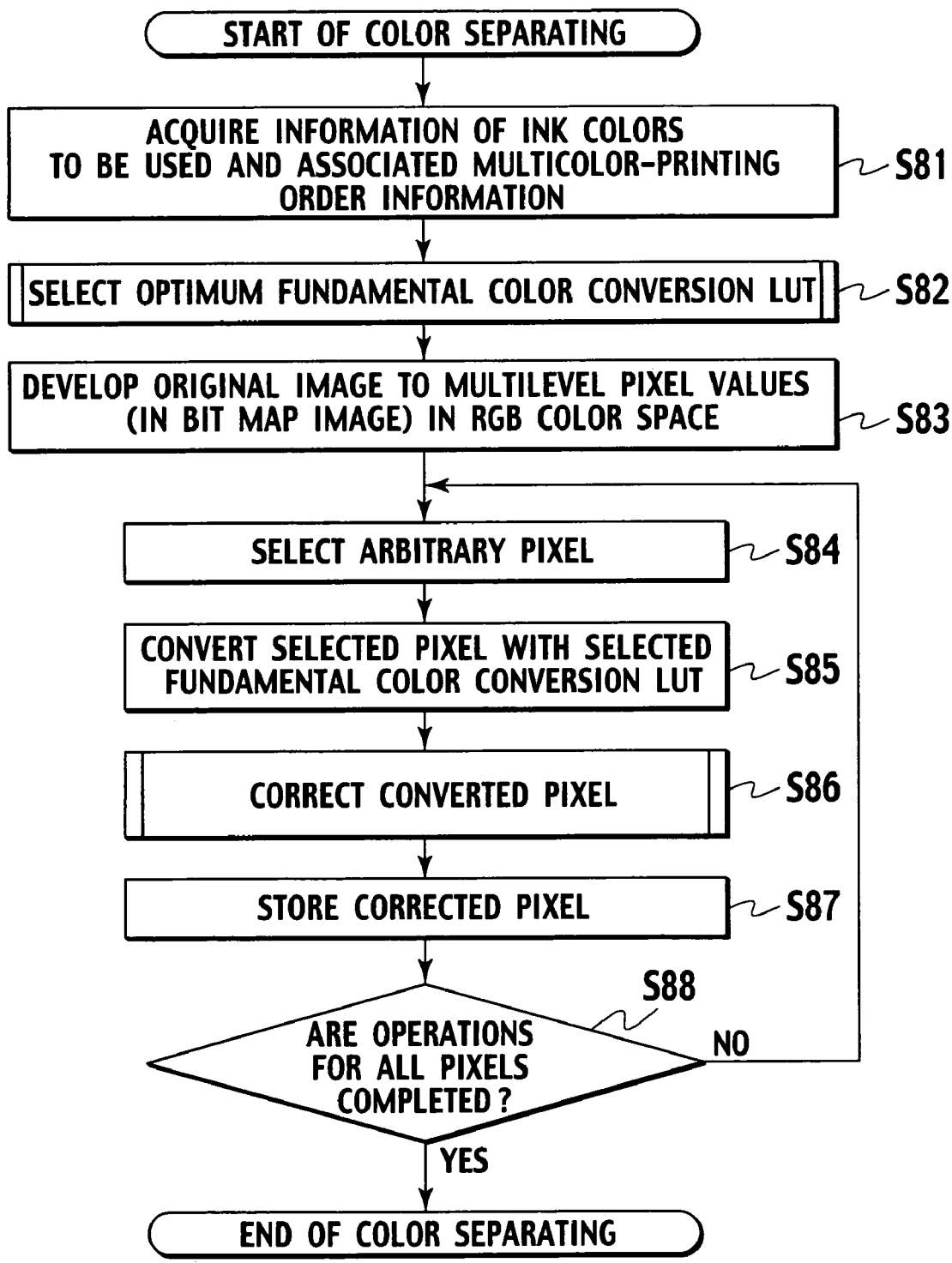
FIG. 11 is a flowchart illustrating a detailed procedure (second embodiment) for correcting a fundamental color conversion LUT shown in step S06 in FIG. 2.

FIG. 11 is a flowchart illustrating a detailed procedure, in the second embodiment, for the color separation shown in step S06 in FIG. 2 In step S81, the image processing apparatus 140 acquires information of the actually used ink colors C1, C2 and the associated multicolor-printing order information such as the order C1→C2 or C2→C1 from the control unit 104.

In step S82, the fundamental color conversion LUT selecting section 143 selects an optimum fundamental color conversion LUT (for example, the fundamental color conversion LUT 131-2) from among the six fundamental color conversion LUTs 131-1, 131-2, ..., 131-6 preliminarily prepared in compliance with different combinations of fundamental ink colors. This selecting procedure of the second embodiment is executed in the same manner as that (in step S22) of the first embodiment.

In step S83, the image processing apparatus 140 develops the multicolor original image data read out by the original readout section 101 into pixel values (that is, bit map image data) in the RGB color space.

In step S84, the color converting section 141 selects an arbitrary pixel j(r, g, b) of the multilevel image data in the RGB color space to be converted by the selected fundamental color conversion LUT 131-2 as a parameter.

In step S85, the color converting section 141 converts the selected pixel j(r, g, b) in the RGB color space into a pixel j(C1(2)(r, g, b), C2(2)(r, g, b)) in the fundamental ink color space of the selected fundamental color conversion LUT 131-2.

In step S86, the correction processing section 142 corrects the converted pixel j(C1(2)(r, g, b), C2(2)(r, g, b)) in the fundamental ink color space of the selected fundamental color conversion LUT 131-2, based on feature points information of the actually used ink colors C1, C2 and feature points information of the fundamental ink colors C1(2), C2(2) defining the fundamental ink color space of the selected fundamental color conversion LUT 131-2. This correction procedure of the second embodiment is executed in the same operation as that (in step S23) of the first embodiment.

In step S87, the control unit 104 stores the corrected pixel j(c1(r, g, b), c2(r, g, b)) in the RAM of the control unit 104.

In step S88, the image processing apparatus 140 discriminates whether or not correcting for all the pixels in the multilevel image data of the RGB color space are completed. Then, if this condition is fulfilled, this color separation is completed, and if not, the procedure is routed back to step S84.

The features of the second embodiment described above are summed up that:

(F1') the optimum fundamental color conversion LUT 131-2 is selected from the color conversion LUT group 131 (the set of fundamental color conversion LUTs 131-1, 131-2, ..., 131-6) preliminarily prepared in compliance with different combinations of fundamental ink colors, based on information of the actually used ink colors C1, C2 and information of fundamental ink colors C1(i), C2(i) (for i=1, 2, ..., 6) defining the fundamental ink color space of each fundamental color conversion LUT groups 131-$i$ (for i=1, 2, ...,6); and (F2') an arbitrary pixel j(C1(2)(r, g, b), C2(2)(r, g, b)), which is converted by the selected fundamental color conversion LUT 131-2, in the fundamental ink color space of the selected fundamental color conversion LUT 131-2 is corrected as a new pixel j(c1(r, g, b), c2(r, g, b)), based on feature points information of the actually used ink colors C1, C2 and feature points information of the fundamental ink colors C1(2), C2(2) defining the fundamental ink color space of the selected fundamental color conversion LUT 131-2.

Thus, the second embodiment according to the present invention enables pixel values in a display color space, corresponding to the original color of multicolor original image data, to be converted to the pixel values in an ink color space, corresponding to the ink colors to be used in actual multicolor-printing, without preliminarily preparing a color conversion LUT for each printing condition, whereby a favorable printing result can be obtained.

Third Embodiment

Although the first and second embodiments have been described in conjunction with examples wherein the correcting is carried out in the image processing apparatus 140 incorporated in the stencil printing machine 100, the third embodiment of the present invention is described in conjunction with an example wherein the above-described correcting is carried out in the printer driver 240 incorporated in the original making device 200.

Figure 12:
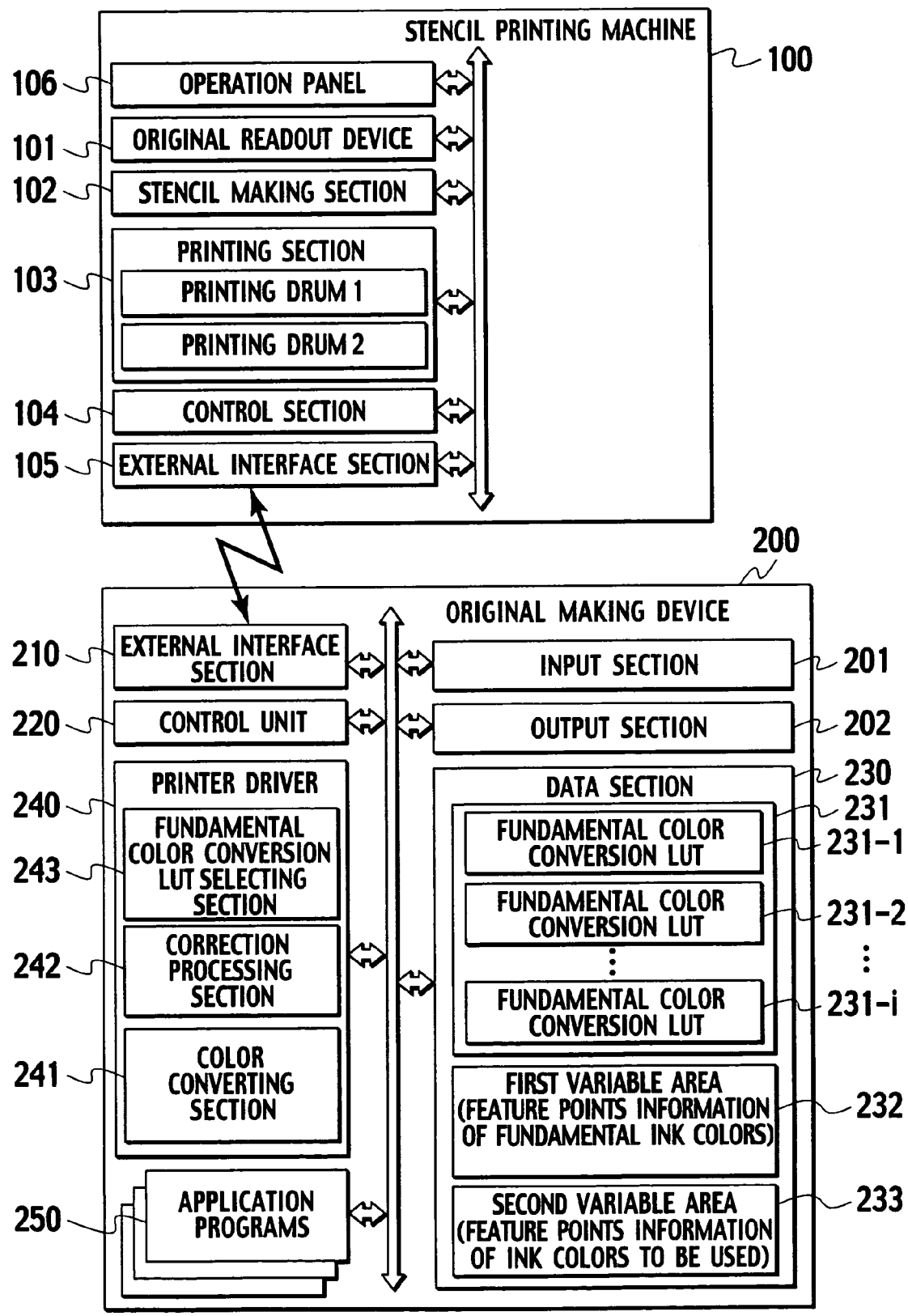
FIG. 12 is a schematic block diagram illustrating a structure of a printing system of a third embodiment according to the present invention.

As shown in FIG. 12, the original making device 200 includes: an input section 201 (such as a keyboard or a mouse) for inputting various information; an output section 202 (such as a display device) for displaying processed information and data; an external interface section 210 having a function for allowing the original making device 200 to be connected to other devices (such as the stencil printing machine 100) via network; a control unit 220 having a central processing unit (CPU) (not shown), a ROM (not shown) for storing programs and data, and RAM (not shown) for serving as work areas; a data section 230; a printer driver 240; and a high-capacity hard disc (not shown) for storing at least one application program 250. The original making device 200 is realized by, for instance, a personal computer.

Further, the date section 230 includes a color conversion LUT group 231 including a set of fundamental color conversion LUTs 231-1, 231-2, ..., 231-6, a first variable area 232, and a second variable area 233. Furthermore, the printer driver 240 includes a color converting section 241, a correction processing section 242, and a fundamental color conversion LUT selecting section 243.

Also, the color conversion LUT group 231, the first variable area 232, the second variable area 233, the color converting section 241, the correction processing section 242, and the fundamental color conversion LUT selecting section 243 are equivalent to the fundamental color conversion LUT group 231, the first variable area 232, the second variable area 233, the color converting section 241, the correction processing section 242, and the fundamental color conversion LUT selecting section 243, respectively. Therefore, detailed descriptions of these components are herein omitted.

Hereinafter, a brief description is made of a procedure for realizing the third embodiment in the same way as that of the second embodiment.

When a user directs the original making device 200 to multicolor-print multicolor original image data made by the application programs 250, the printer driver 240 acquires information of the actually used ink colors, and the associated multicolor-printing order information from the stencil printing machine 100 via the external interface section 210.

Then, the color converting section 241 selects an optimum fundamental color conversion LUT (for example, the fundamental ink color conversion LUT 231-2) from the color conversion LUT group 231 (that is, the set of fundamental color conversion LUTs 231-1, 231-2, ..., 231-6) preliminarily prepared in compliance with different combinations of fundamental ink colors.

Next, the color converting section 241 selects an arbitrary pixel j(r, g, b) in the RGB color space of the multicolor original image data made by the application program 250, and thereafter converts the pixel value j(r, g, b) from the RGB color space of the selected fundamental color conversion LUT 231-2 into a pixel value j(C1(2)(r, g, b), C2(2)(r, g, b)) in the fundamental ink color space of the selected fundamental color conversion LUT 231-2. Then, the pixel value (image data) j(C1(2)(r, g, b), C2(2)(r, g, b)) in the fundamental ink color space of the selected fundamental color conversion LUT 231-2 is delivered to the correction processing section 242.

Additionally, the correction processing section 242 corrects the received pixel j(C1(2)(r, g, b), C2(2)(r, g, b)) in the fundamental ink color space of the selected fundamental color conversion LUT 231-2, based on feature points information of the actually used ink colors C1, C2 and feature points information of the fundamental ink colors C1(2), C2(2) defining the fundamental ink color space of the selected fundamental color conversion LUT 231-2, thereby generating stencil making image data (as described in FIG. 11).

Such procedures are repeatedly executed until the conversion processing for all pixel values in the RGB color space of the multicolor original image data is completed.

Subsequently, if the conversion processing is completed, the stencil making image data is transmitted to the stencil printing machine 100 via the external interface section 210.

Of course, it is needless to say that stencil making image data is converted by the printer driver 240 in a form that can be read out by the stencil printing machine 100.

Subsequently, the fundamental color conversion LUT selecting section 243, the color converting section 241, and the correction processing section 242 of the printer driver 240 execute the processing set forth above with reference to the first and second embodiments.

Thus, the third embodiment of the present invention enables pixel values in a display color space, corresponding to the original color of multicolor original image data, to be converted to the pixel values in an ink color space, corresponding to ink colors to be used in actual multicolor-printing, without preliminarily preparing a color conversion LUT for each printing condition, thereby enabling a favorable printing result to be obtained.

As will be clearly understood from the foregoing, with the image processing apparatus 140, the image processing method, and printer driver 240 of the presently fled embodiments, for example, the optimum fundamental color conversion LUT 131-2 is selected from among the color conversion LUT group 131 (the set of fundamental color conversion LUTs 131-1, 131-2, ..., 131-6), based on information of the actually used ink colors Cn (n=1,2), and information of the fundamental ink colors Cn(i) (i=1, 2, ... ,6) defining the fundamental ink color space of each fundamental color conversion LUT, on which the pixel values of the output ink color space, converted referring to the selected fundamental color conversion LUT 131-2, or the pixel values of the fundamental ink color space, stored in the fundamental color conversion LUT 131-2, are corrected depending on feature points information of the actually used ink color Cn and feature points information of the fundamental color ink Cn(i) in the selected fundamental color conversion LUT 131-2.

Therefore, the color conversion LUT group 131 enable pixel values in a display color space, associated with an original color of multicolor original image data, to be converted to pixel values in an ink color space, associated with the actually used ink colors.

Thus, merely preparing the color conversion LUT group 131 corresponding to different combinations of fundamental ink colors enables a favorable print result to be obtained without preliminarily preparing a comprehensive color conversion LUT on consideration of the actually used ink colors and the associated multicolor-printing order.

Further, with the fundamental color conversion LUT selecting section 143 configured to select the fundamental color conversion LUT whose color difference between the actually used ink colors, and the fundamental ink colors in each fundamental color conversion LUT is minimal, the optimum fundamental color conversion LUT can be selected.

Furthermore, with feature points information configured to include the pixel values, of typical feature points information in the display color space corresponding to the multicolor original image, in the fundamental ink color space corresponding to the fundamental color ink, color conversion can be conducted at high accuracy.

The entire content of Japanese Patent Application No. P2004-140813 with a filing date of May 11, 2004 is herein incorporated by reference.

Although the present invention has been described above by reference to certain embodiments of the invention, the invention is not limited to the embodiments described above and modifications will occur to those skilled in the art, in light of the teachings.

For instance, although the presently filed embodiment has been described in conjunction with an example wherein the combinations, or the number i of combinations, of the ink colors for the color conversion LUT groups 131 to be preliminarily prepared have six patterns, the present invention is not limited to such an example and may have six patterns in combination of other ink colors while the number i of combinations may be less than six patterns or greater than seven patterns.

Similarly, while with the presently filed embodiment, the correction values of the actually used ink colors C1, C2 are acquired from feature points information corresponding to the GB plane with the conditions R=0, R=1, the correction values of the actually used ink colors C1, C2 may be acquired from feature points information corresponding to the RG plane with the conditions B=0, B=1 in a similar result.

Also, combinations of ink colors in more than three colors can be addressed by executing similar calculations.

Moreover, although the presently filed embodiment has been described taking the stencil printing machine 100 available to perform two-color printing with two printing drums that are mounted in fixed positions, the present invention may have application not only to the stencil printing machine but also to a multicolor printing machine, provided with more than three printing drums and printing machines of other types such as an offset printing machine and an ink jet type printing machine.

In addition, the image processing apparatus 140 may be incorporated not only in the stencil printing machine 100 but also in other devices such as a printer server or a raster image processor or configured in structure as an independent unit.

The scope of the invention is absolutely defined by the following claims.

What is claimed is:

1. An image processing apparatus comprising:
    a color conversion LUT selecting section selecting a fundamental color conversion LUT, as an optimum fundamental color conversion LUT, from among a set of fundamental color conversion LUTs, preliminarily prepared in compliance with different combinations of fundamental ink colors, based on color value information of ink colors actually used in a printing section of a multicolor-printing operation and color value information of fundamental ink colors defining each fundamental color conversion LUT;
    a color converting section converting multilevel pixel values, associated with a multicolor original image, in a display color space of the selected fundamental color conversion LUT into multilevel pixel values in an ink color space of the selected fundamental color conversion LUT; and
    a correction processing section correcting at least one set of multilevel pixel values of the converted multilevel pixel values in the ink color space of the selected fundamental color conversion LUT and multilevel pixel values in an ink color space, stored preliminarily in the selected fundamental color conversion LUT, based on a multilevel pixel value on a straight line connecting two points of a plurality of feature points of the ink colors actually used in the printing section of the multicolor-printing operation and a difference between a multilevel pixel value of the at least one set of multilevel pixel values and a multilevel pixel value on a straight line connecting two points of a plurality of feature points of fundamental ink colors defining the ink color space of the selected fundamental color conversion LUT.

2. The image processing apparatus according to claim 1, wherein the color conversion LUT selecting section selects a fundamental color conversion LUT, as the optimum fundamental color conversion LUT, whose color difference between the ink colors actually used in the printing section of the multicolor-printing operation and the fundamental ink colors defining each fundamental color conversion LUTs is minimal, from among the set of fundamental color conversion LUTs.

3. The image processing apparatus according to claim 1, wherein the plurality of feature points are points, into which typical feature points in the display color space are converted, in the ink color space.

4. The image processing apparatus according to claim 3, wherein the typical feature points are eight apexes of a predetermined cube formed in the display color space.

5. The image processing apparatus according to claim 3, wherein the multilevel pixel values, into which typical feature points in the display color space are converted, are allowable to lie in a value outside the ink color space.

6. A computer program product comprising computer readable medium having stored thereon computer executable instructions that, when executed on a computer, causes the computer to perform an image processing method comprising:
selecting a fundamental color conversion LUT, as an optimum fundamental color conversion LUT, from among a set of fundamental color conversion LUTs, preliminarily prepared in compliance with different combinations of fundamental ink colors, based on color value information of ink colors actually used in a printing section of a multicolor-printing operation and color value information of fundamental ink colors defining each fundamental color conversion LUT;
correcting multilevel pixel values in an ink color space of the selected fundamental color conversion LUT, based on a multilevel pixel value on a straight line connecting two points of a plurality of feature points of the ink colors actually used in the printing section of the multicolor-printing operation and a difference between a multilevel pixel value of the multilevel pixel values in an ink color space of the selected fundamental color conversion LUT and a multilevel pixel value on a straight line connecting two points of a plurality of feature points of fundamental ink colors defining the selected fundamental color conversion LUT; and
converting multilevel pixel values, associated with a multicolor original image, in a display color space of the selected fundamental color conversion LUT, into the corrected multilevel pixel values in the ink color space of the selected fundamental color conversion LUT.

7. A method for driving a printer in a multicolor printing mode, comprising:
selecting, by a color conversion LUT selecting section, a fundamental color conversion LUT, as an optimum fundamental color conversion LUT, from among a set of fundamental color conversion LUTs, preliminarily prepared in compliance with different combinations of fundamental ink colors, based on color value information of ink colors actually used in the printer and color value information of fundamental ink colors defining each fundamental color conversion LUT;
converting, by a color converting section, multilevel pixel values, associated with a multicolor original image made by an application program, in a display color space of the selected fundamental color conversion LUT into multilevel pixel values in an ink color space of the selected fundamental color conversion LUT; and
correcting, by a correction processing section, at least one set of multilevel pixel values of the converted multilevel pixel values and multilevel pixel values in the ink color space of the selected fundamental color conversion LUT and multilevel pixel values in an ink color space, stored preliminarily in the selected fundamental color conversion LUT, in the ink color space, based on a multilevel pixel value on a straight line connecting two points of a plurality of feature points information of the ink colors actually used in the printer and a difference between a multilevel pixel value of the at least one set of multilevel pixel values and a multilevel pixel value on a straight line connecting two points of a plurality of feature points of fundamental ink colors defining the selected fundamental color conversion LUT.

8. The method according to claim 7, wherein the color conversion LUT selecting section selects a fundamental color conversion LUT, as the optimum fundamental color conversion LUT, whose color difference between the ink colors actually used in the printer and the fundamental ink colors defining each fundamental color conversion LUT is minimal, from among the set of fundamental color conversion LUTs.

9. The method according to claim 7, wherein the plurality of feature points are points, into which typical feature points in the display color space are converted, in the ink color space.

10. The method according to claim 9, wherein the typical feature points are eight apexes of a predetermined cube in the display color space.

11. The method according to claim 7, wherein the multilevel pixel values, into which typical feature points in the display color space are converted, are allowable to lie in a value outside the ink color space.

12. An image processing apparatus comprising:
a color conversion LUT selecting section selecting a fundamental color conversion LUT, as an optimum fundamental color conversion LUT, from among a set of fundamental color conversion LUTs, preliminarily prepared in compliance with different combinations of fundamental ink colors, based on color value information of ink colors actually used in a printing section of a multicolor-printing operation and color value information of fundamental ink colors defining each fundamental color conversion LUT;
a color converting section converting multilevel pixel values, associated with a multicolor original image, in a display color space of the selected fundamental color conversion LUT into multilevel pixel values in an ink color space of the selected fundamental color conversion LUT; and
a correction processing section performing a correction to at least one set of multilevel pixel values of the converted multilevel pixel values in the ink color space of the selected fundamental color conversion LUT and multilevel pixel values in an ink color space, stored preliminarily in the selected fundamental color conversion LUT, based on a multilevel pixel value on a straight line connecting two points of a plurality of feature points of the ink colors actually used in the printing section of the multicolor-printing operation and a difference between a multilevel pixel value of the at least one set of multilevel pixel values and a multilevel pixel value on a straight line connecting two points of a plurality of feature points of fundamental ink colors defining the ink color space of the selected fundamental color conversion LUT, wherein
the color conversion LUT selection section selects a fundamental color conversion LUT, as the optimum fundamental color conversion LUT, whose color difference between the ink colors actually used in the printing section of the multicolor printing operation and the fundamental ink colors defining each fundamental color conversion LUTs is minimal, from among the set of fundamental color conversion LUTs, wherein the plurality of feature points are points, into which eight apexes of a predetermined cube formed in the display color space are converted, in the ink color space, wherein the correction processing section is operable to:

(1) perform the correction to two points of the plurality of feature points corresponding to apexes of each side of the cube;

(2) perform the correction to each point on each side of the cube and a point on an opposite side of the cube; and (3) perform the correction to each point on each surface of the cube and a point on an opposite surface of the cube with a distance of a length of a side of the cube from each point.

13. A method for driving a printer in a multicolor printing mode, comprising:

selecting, by a color conversion LUT selecting section, a fundamental color conversion LUT, as an optimum fundamental color conversion LUT, from among a set of fundamental color conversion LUTs, preliminarily prepared in compliance with different combinations of fundamental ink colors, based on color value information of ink colors actually used in the printer and color value information of fundamental ink colors defining each fundamental color conversion LUT;

converting, by a color converting section, multilevel pixel values, associated with a multicolor original image made by an application program, in a display color space of the selected fundamental color conversion LUT into multilevel pixel values in an ink color space of the selected fundamental color conversion LUT; and performing a correction, by a correction processing section, to at least one set of multilevel pixel values of the converted multilevel pixel values in the ink color space of the selected fundamental color conversion LUT and multilevel pixel values in an ink color space, stored preliminarily in the selected fundamental color conversion LUT, in the ink color space, based on a multilevel pixel value on a straight line connecting two points of a plurality of feature points information of the ink colors actually used in the printer and a difference between a multilevel pixel value of the at least one set of multilevel pixel values and a multilevel pixel value on a straight line connecting two points of a plurality of feature points of fundamental ink colors defining the selected fundamental color conversion LUT, wherein the color conversion LUT selecting section selects a fundamental color conversion LUT, as the optimum fundamental color conversion LUT, whose color difference between the ink colors actually used in the printer and the fundamental ink colors defining each fundamental color conversion LUTs is minimal, from among the set of fundamental color conversion LUTs, wherein the plurality of feature points are points, into which eight apexes of a predetermined cube formed in the display color space are converted, in the ink color space, wherein the correction processing section is operable to:

(1) perform the correction to two points of the plurality of feature points corresponding to apexes of each side of the cube;

(2) perform the correction to each point on each side of the cube and a point on an opposite side of the cube; and (3) perform the correction to each point on each surface of the cube a point on an opposite surface of the cube with a distance of a length of a side of the cube from each point.

* * * * *